July 2, 1968   S. E. GRANT   3,390,765
PALLET-PROVIDED BALE
Filed Nov. 7, 1966

INVENTOR.
SELWYN E. GRANT
BY C. G. Stratton
ATTORNEY 3,390,765
PALLET-PROVIDED BALE
Selwyn E. Grant, 2612 S. Beverly Drive,
Los Angeles, Calif. 90034
Filed Nov. 7, 1966, Ser. No. 592,593
7 Claims. (Cl. 206—65)

ABSTRACT OF THE DISCLOSURE

A single package or bundle, or two or more such items, stacked in compact arrangement, as well as materials such as cotton batting, hay and the like, are arranged in the form of a preferably rectangular bale which is rendered more easily handleable for transport and long-distance shipping by the present means. The same comprises a plurality of pallets and bale-encircling bands or straps that pass through openings in the pallets and permanently connect them to the bale. Said pallets space the bale from a support surface so that the tines of a fork-lift truck may be introduced into said space for engaging and, thereby, supporting the bale for transport from place to place by said truck. It is usual to provide fork-lift-engaging pallets. In this instance, the pallets serve as means to space the bale from its support surface and as members that locate the bale-banding members in desired intersecting relation.

Brief summary of the invention

The present pallets, in relation to conventional pallets, are quite small and are used in transversely spaced single, double or triple pairs, depending on the size of the bale. The items of the bale may be stacked upon a desired arrangement of intersecting bands or straps and the ends of the latter trained upwardly along the sides of the bale and then across the top. The ends of said bands or straps are passed through holes in pallets placed on the top of the bale with the ends connected, as by clips, to hold the pallets captive to the bale and the bale tightly bundled. Since, as indicated, the pallets are arranged as transversely spaced pairs, after upending said bale so the same rests upon the pallets, the tine of a forklift truck may be introduced into the space between the pallets so the bale may be lifted for transport from place to place.

As an alternative, the pallets may be placed upon a support surface in pairs, as indicated, a set of intersecting bands or straps reeved through them, and the ends of said straps trained up and over the top of the bale that is stacked up on the pallets. Said ends are clipped together, as before. Since the bale is right end up, it does not require to be upended.

The pallets are preferably of channel shape, the webs thereof being in engagement with the bale, and the two flanges serving to space said web and, therefore, the bale from a support surface.

Detailed description of the invention

In addition to the foregoing, this invention has for its objects to provide novel and improved pallet means that, in a simple and facile manner, may be connected to the end of a bale to space the latter from a support surface, thereby enabling a forklift-truck-handling of the bale, minimizing the physical effort required to bundle a bale in such manner, and providing means to girdle a bale in which such pallets constitute elements of the bale-girdling means.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. Moreover, said drawing merely shows, and the following description merely describes, preferred embodiments of the present invention which are given by way of illustration or example only.

In the drawing, like reference characters designate similar parts in the several views.

Figure 1:
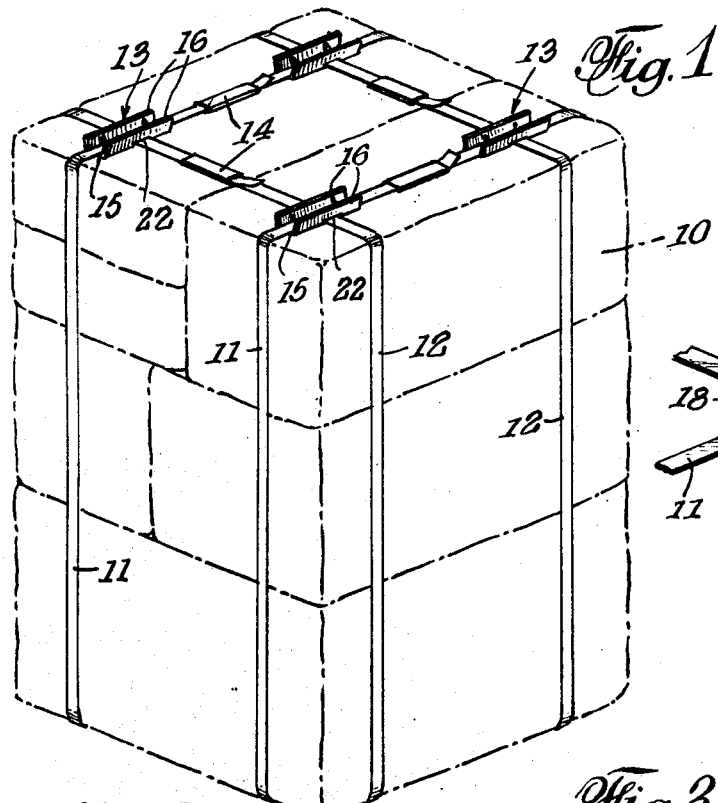
FIG. 1 is a perspective view of a pallet-provided bale according to the present invention.

The bale 10 may, as shown in FIG. 1, comprise packages, bundles or like units of various sizes and shapes and stacked to form a preferably rectangular solid; or the bale may be made up of other materials, as cotton, batting, hay, scrap paper, and the like. Said bale is encircled, in one direction, by bands or straps 11 and, in a transverse direction, by bands 12, to hold the elements of the bale in solid form and capable of being transported, shipped or otherwise handled as a unit. According to the invention, plural pairs of pallets 13 are non-displaceably retained by said bands or straps against one surface of the bale to provide the bale with means to space said bale surface from a support surface, thereby constituting feet for the bale.

Figure 2:
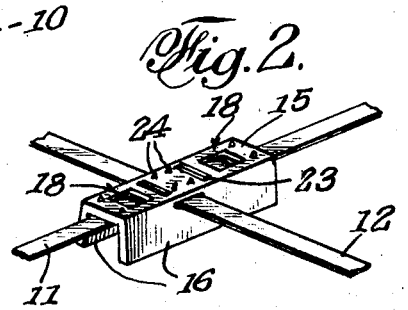
FIG. 2 is an enlarged and fragmentary perspective view showing one of the pallets inverted and in bale-supporting position.

The bale is made up by first arranging the bands on a floor in an intersecting pattern, according to the number of bands used. As in FIG. 1, the bands 11 and 12 may be merely crossed over each other and, as in FIG. 2, they may be passed through openings in the pallets 13 at each intersection of the bands. The bands are then trained upwardly along the sides of the bale that is placed on the intersecting portions of the bands, the ends thereof then being bent over the top of the bale. In the form of FIG. 2, these band ends, where they overlap, are connected by clips 14 or in other ways, thereby producing a bale in which the pallets 13 constitute support feet, as indicated. In the form of FIG. 1, the band ends are reeved through openings in a set of pallets 13, and these ends joined by clips 14, as before.

Both forms as in FIGS. 1 and 2 have the pallets in face contact with an end face of the bale. Only the form of FIG. 1 requires that the bale be inverted to bring the pallets to the same support position as the pallets of FIG. 2.

Figure 3:
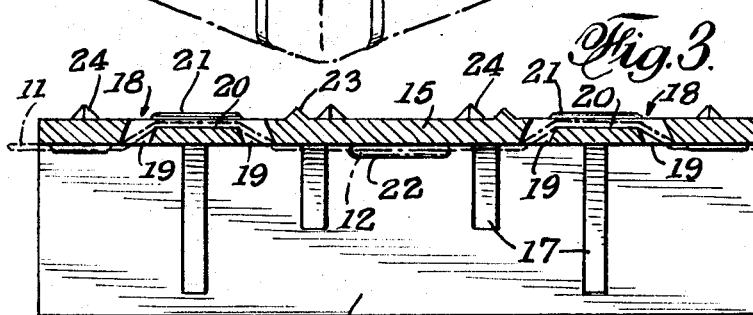
FIG. 3 is a further enlarged longitudinal sectional view of a pallet, as in FIGS. 1 and 2.
Figure 4:
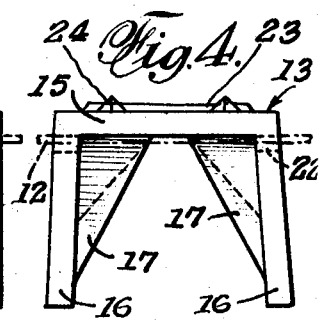
FIG. 4 is an end view thereof.
Figure 5:
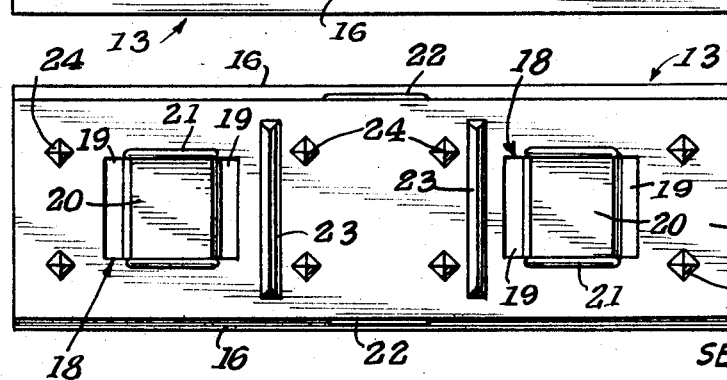
FIG. 5 is a view of the face of the pallet that is engaged with the bale.

The pallet shown in FIGS. 3, 4 and 5 may be made of stamped, forged or cast metal, or of non-metallic material such as high-impact plastic and the like. Said pallet comprises, generally, a channel member having a web 15, slightly diverging flanges 16 extending from the side edges of said web, and reinforcing fins 17 bracing the construction so the flanges may serve as legs to space the web above a support surface under the weight of a bale resting upon said web of each pallet of a complement thereof.

The web is provided with two longitudinally spaced holes or passages 18, so formed that no portion of a band 11 threaded therethrough is disposed above the outer face of said web. To this end, each hole 18 has two band-passing ends 19 connected by an underflush recess 20. Thus, as shown in FIG. 3, a band may be threaded upwardly from the bottom of each pallet web 15 through one end 19 of one of the holes 18 along the recess 20 of said hole, and then downwardly back to the web bottom. The band is then trained along the web bottom and threaded through the other hole 18 in the same manner, then extends longitudinally away from the pallet. Such threading of a band may be guided by ribs 21 on each side of the hole 18.

Preferably centrally between the ends of the pallet, threading slots or holes 22 are provided in the flanges 16 immediately adjacent the web 15 for a band 12 that intersects the band 11. Guide ribs 21, as before, may be provided on the inner face of the web for said band 12.

Transverse reinforcing ribs 23 may be provided on the outer face of the web; the same, combining with suitably placed spurs 24, are adapted to impinge on and indent the end of a bale to hold the same displaceably against said bale end.

It will be understood that the height of the pallet flanges 16 is such as to space the bale from a support surface, and also, that the pallets of each pair are arranged to provide a space suitable for the tines of a forklift to be introduced therebetween, thereby enabling said forklift to raise and transport the bale from one place to another.

It will be clear that said pallet units are provided as bale-supporting feet and not for engagement by the forklift tines. The latter, therefore, while quite strong for the purpose do not require to have the size and strength, nor be of the costly construction, of pallets that are engaged by forklift tines to raise a bale resting thereupon.

While the foregoing has illustrated and described what is now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A bale girdled by at least two pairs of spaced bands that intersect at at least one end of the bale provided with
    (a) a bale-supporting pallet at each intersection of the bands at said one end, thereby providing the band-girdled bale with four separate pallets at said end,
    (b) each pallet having band-passing holes through which the bands are threaded.

2. A bale according to claim 1 in which the pallets are arranged in aligned pairs and said pairs of pallets are spaced from each other to accommodate the transversely spaced tines of a forklift truck to engage the end of the bale provided with the pallets and lift the same for transport from place to place.

3. A bale according to claim 2 in which each pallet comprises a channel having a web held against the bale by the bands, and flanges serving as feet to space the bale above a support surface, said webs and flanges of the aligned pallets being respectively aligned.

4. A bale according to claim 3 in which the mentioned band-passing holes are provided in the web for the bands extending in one direction and in the flanges for the intersecting bands.

5. A bale according to claim 4 in which the mentioned holes in the web are arranged in longitudinally spaced pairs, band-housing recesses extending between the holes of each pair thereof, said recesses accommodating portions of the bands that extend between the holes of each pair and on a plane underflush of the outer face of the web.

6. A bale-supporting pallet comprising a channel having
    (a) a web,
    (b) a flange extending from each side edge of the web,
    (c) at least two pairs of longitudinally spaced band-threading holes in said web,
    (d) each pair of holes being connected by a recess underflush of the outer face of the web to accommodate portions of a band threaded through said holes along the length of the web, and
    (e) slots in mid-portions of the flanges immediately adjacent the inner face of the web for a band extending transversely of the first-mentioned band.

7. A pallet according to claim 6 in which the outer face of the web is provided with spurs to impinge and indent the surface of a bale in contact with said surface.

References Cited

UNITED STATES PATENTS

| | | | |
|---|---|---|---|
| 2,611,569 | 9/1952 | Coleman et al. | |
| 2,626,456 | 1/1953 | Harrison | 108—55 |
| 3,331,496 | 7/1967 | Marsden et al. | 206—60 |

JOSEPH R. LECLAIR, *Primary Examiner.*

WILLIAM T. DIXSON, JR., *Examiner.*